Patented Aug. 12, 1952

2,606,930

UNITED STATES PATENT OFFICE 2,606,930

6-METHYLOCTA-3:5:7-TRIEN-2-ONE

Ian Morris Heilbron and Basil Charles Leicester Weedon, London, and Ewart Ray Herbert Jones, Manchester, England, assignors to Glaxo Laboratories Limited, Greenford, England, a British company No Drawing. Application March 7, 1950, Serial No. 148,261. In Great Britain March 22, 1949

11 Claims. (Cl. 260—593)

This invention is concerned with improvements in or relating to the preparation of a new unsaturated ketone, namely 6-methylocta-3:5:7-trien-2-one, which may be represented by the following structural formula

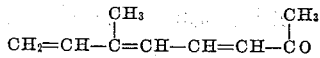

This compound is of use in the synthesis of vitamin A.

We have found that the new ketone can conveniently be prepared by reacting 3-methylpenta-2:4-dien-1-ol with acetone in the presence of aluminium tertiary butoxide.

Accordingly the invention comprises the new compound 6-methylocta-3:5:7-trien-2-one represented by the following structural formula

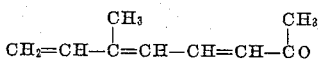

According to a further feature of the invention we provide a process for the preparation of a new ketone, namely 6-methylocta-3:5:7-trien-2-one in which 3-methylpenta-2:4-dien-1-ol is reacted with acetone in the presence of aluminium tertiary butoxide.

We now proceed to give details of the preferred conditions of the process according to the invention.

We prefer to carry out the process in the presence of a suitable diluent which may be an excess of acetone or another organic solvent which is inert to the reactants and the products of the process. The concentration of the carbinol in the reaction mixture is preferably less than 5%. The process is also preferably carried out at temperatures within the range 50°–80° C. for example at the boiling point of the reaction mixture; for this purpose, where a suitable diluent is used, we prefer to use organic solvents forming with the reactants a mixture having a boiling point within the stated range, thus enabling the temperature of reaction to be readily controlled; examples of organic solvents which may be used as suitable diluents are benzene, petroleum ether, dipropyl ether and dibutyl ether and mixtures of two or more of these solvents.

The process is also preferably carried out in an inert atmosphere, for example in an atmosphere of nitrogen.

3-methylpenta-2:4-dien-1-ol, which is a new compound may be prepared by any convenient method for example by reacting 3-methylpenta-4-en-1-yn-3-ol (Cymerman, Heilbron and Jones, J. C. S., 1945, 90) with hydrogen in the presence of a palladised charcoal catalyst to yield 3-methylpenta-1:4-dien-3-ol; the latter carbinol may be isomerised in the presence of dilute acid to yield the desired 3-methylpenta-2:4-dien-1-ol.

The new compound, 6-methylocta-3:5:7-trien-2-one, in the purest form we have been able to obtain, shows the following characteristics:

Refractive index $(n_D^{14°}) = 1.6025$

Light absorption: max. 304 m$\mu$
$E_{cm.}^{1\%}$ 2,400
$\epsilon_1$ 32,600

It will readily be understood that the above characteristics were determined on the purest materials we have been able to obtain and that the characteristics quoted may be liable to variation dependant on the purity of the product.

In order that the invention may be well understood the following example is given only as an illustration.

Example (a) *3-methylpenta-1:4-dien-3-ol.*—A solution of 3-methylpenta-4-en-1-yn-3-ol (10 g.) (Cymerman, Heilbron and Jones, J. C. S., 1945, 90) in methanol (30 c. c.) was shaken in hydrogen in the presence of a palladium-charcoal catalyst (1 g. 2% Pd) until 2410 c. c. (20° C. 757 mm.) of gas had been absorbed (equivalent to 1° F.). After removal of the catalyst, the methanol solution was diluted with water and the product isolated with ether in the usual manner. Distillation gave 3-methylpenta-1:4-dien-3-ol (6 g.) B. P. 68–72° C./120 mm. $n_D^{20°}$ 1.4400. (Found: C, 74.3; H, 10.2. $C_6H_{10}O$ requires: C, 73.4; H, 10.25%.)

(b) *3-methylpenta-2:4-dien-1-ol.*—A mixture of the above carbinol (5.7 g.) dilute sulphuric acid (360 c. c.; 1% w./w.) and a trace of hydroquinone was shaken in an atmosphere of nitrogen at 20° C. for 4 hours. Isolation of the product with ether and distillation gave 3-methylpenta-2:4-dien-1-ol (1.5 g.) B. P. 106° C./80 mm. $n_D^{19°\,C.}$ 1.4942. (Found: C, 72.95; H, 10.6. $C_6H_{10}O$ requires: C, 73.4 H, 10.25%.) Light absorption: Maximum 2280 Å.; $\epsilon$24,500.

(c) *6-methylocta-c:5:7-trien-2-one.*—A solution of 3-methylpenta-2:4-dien-1-ol (9.2 g.) and aluminum tert-butoxide (27 g.) in acetone (270 c. c.) and benzene (675 c. c.) was refluxed in nitrogen for 36 hours. Isolation of the product in the usual manner and distillation gave 6-methylocta-3:5:7-trien-2-one (3.8 g.) B. P. 49–54° C./10$^{-2}$ mm. $n_D^{19°\,C.}$ 1.584. (Light absorption: Maximum Å. $\epsilon$ 30,000. Found: C, 79.05; H, 9.15. $C_9H_{12}$ requires: C, 79.35; H, 9.15%). The 2:4- dinitrophenylhydrazone crystallised from ethyl acetate in dark red needles, M. P. 204–205° C.

We claim:

1. As a new compound, 6-methylocta-3:5:7-trien-2-one represented by the following structural formula

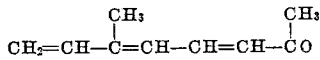

2. A process for the preparation of 6-methylocta-3:5:7-trien-2-one, which comprises, reacting 3-methylpenta-2:4-dien-1-ol with acetone in the presence of aluminium tertiary butoxide.

3. A process as claimed in claim 2 in which the reaction is carried out in the presence of an excess of acetone.

4. A process as claimed in claim 2 in which the reaction is carried out in the presence of an inert organic solvent.

5. A process as claimed in claim 2 in which the reaction is carried out in the presence of a solvent selected from the group consisting of, benzene, petroleum ether, dipropyl ether and dibutyl ether.

6. A process as claimed in claim 2, in which the concentration of the carbinol in the reaction medium is less than 5%.

7. A process as claimed in claim 2 in which the reaction is carried out at a temperature within the range of from 50–80° C.

8. A process as claimed in claim 4, in which the nature and quantity of said solvent is so selected that the boiling point of the reaction mixture is within the range of from 50–80° C. and the reaction is effected by boiling said mixture.

9. A process as claimed in claim 2 in which the reaction is carried out in an inert atmosphere.

10. A process for the preparation of 6-methylocta-3:5:7-trien-2-one, which comprises, reacting 3-methylpenta-2:4-dien-1-ol with an excess of acetone and aluminum tertiary butoxide at a temperature within the range 50°–80° C. in the presence of an inert atmosphere.

11. A process as claimed in claim 10, in which the reaction mixture contains an inert organic solvent.

IAN MORRIS HEILBRON.
BASIL CHARLES LEICESTER WEEDON.
EWART RAY HERBERT JONES.

REFERENCES CITED

The following references are of record in the file of this patent:

UNITED STATES PATENTS

| Number | Name | Date |
|---|---|---|
| 2,429,411 | Jones et al. | Oct. 21, 1947 |

OTHER REFERENCES

Batty et al.: J. Chem. Soc. (1938 vol.), pp. 175–79.

Cymerman et al.: J. Chem. Soc. (1945 vol.), pp. 90–94.

Milas et al.: J. Am. Chem. Soc., vol. 70, p. 1292 (1948).